United States Patent
Jain et al.

(10) Patent No.: US 12,057,891 B2
(45) Date of Patent: *Aug. 6, 2024

(54) SYSTEMS AND METHODS FOR ENHANCED-ISOLATION COEXISTING TIME-DIVISION DUPLEXED TRANSCEIVERS

(71) Applicant: QUALCOMM INCORPORATED, San Diego, CA (US)

(72) Inventors: Mayank Jain, Sunnyvale, CA (US); Wilhelm Steffen Hahn, Sunnyvale, CA (US); Jung-Il Choi, Sunnyvale, CA (US); Jeffrey Mehlman, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,450

(22) Filed: Sep. 6, 2022

(65) Prior Publication Data

US 2022/0416912 A1    Dec. 29, 2022

Related U.S. Application Data

(63) Continuation of application No. 17/153,010, filed on Jan. 20, 2021, now Pat. No. 11,469,828, which is a
(Continued)

(51) Int. Cl.
*H04B 15/02* (2006.01)
*H04B 1/525* (2015.01)
*H04L 5/14* (2006.01)

(52) U.S. Cl.
CPC ............ *H04B 15/02* (2013.01); *H04B 1/525* (2013.01); *H04L 5/14* (2013.01)

(58) Field of Classification Search
CPC ............ H04L 5/14; H04B 1/525; H04B 15/02
(Continued)

(56) References Cited

U.S. PATENT DOCUMENTS

| 9,077,440 B2 | 7/2015 | Wyville et al. |
| 10,454,517 B2 | 10/2019 | Zhou et al. |

(Continued)

FOREIGN PATENT DOCUMENTS

| CN | 102237906 A | 11/2011 |
| CN | 107005266 A | 8/2017 |

(Continued)

OTHER PUBLICATIONS

International Search Report and Written Opinion—PCT/US2018/062126—ISA/EPO—Feb. 6, 2019.
(Continued)

*Primary Examiner* — Peter G Solinsky
(74) *Attorney, Agent, or Firm* — Polsinelli LLP

(57) ABSTRACT

A system for enhancing isolation in coexisting time-division duplexed (TDD) transceivers includes: a blocker canceller that transforms a transmit signal of a TDD transceiver into a blocker cancellation signal configured to remove transmit-band interference in a receive signal; a first filter that filters the blocker cancellation signal; a second filter that filters the transmit signal; and a transmit-noise canceller that transforms the filtered transmit signal into a transmit noise cancellation signal configured to remove receive-band interference in the receive signal.

20 Claims, 11 Drawing Sheets

Related U.S. Application Data continuation of application No. 16/653,057, filed on Oct. 15, 2019, now Pat. No. 10,931,383, which is a continuation of application No. 16/197,200, filed on Nov. 20, 2018, now Pat. No. 10,491,313.

(60) Provisional application No. 62/714,378, filed on Aug. 3, 2018, provisional application No. 62/588,864, filed on Nov. 20, 2017.

(58) Field of Classification Search
USPC .......................................................... 370/280
See application file for complete search history.

(56) References Cited

U.S. PATENT DOCUMENTS

| | | | |
|---|---|---|---|
| 10,491,313 | B2 | 11/2019 | Jain et al. |
| 10,854,945 | B2 | 12/2020 | Zhu et al. |
| 10,931,383 | B2 | 2/2021 | Jain et al. |
| 11,469,828 | B2 * | 10/2022 | Jain .................. H04B 1/525 |
| 2005/0197095 | A1 | 9/2005 | Nakamata et al. |
| 2007/0117522 | A1 | 5/2007 | Axness et al. |
| 2010/0227570 | A1 | 9/2010 | Hendin |
| 2015/0038101 | A1 | 2/2015 | Maxim et al. |
| 2015/0156003 | A1 | 6/2015 | Khandani |
| 2015/0171903 | A1 | 6/2015 | Mehlman et al. |
| 2015/0215937 | A1 | 7/2015 | Khandani |
| 2015/0263780 | A1 | 9/2015 | Mehlman et al. |
| 2016/0127112 | A1 | 5/2016 | Shalizi et al. |
| 2016/0294425 | A1 | 10/2016 | Hwang et al. |
| 2017/0026064 | A1 | 1/2017 | Khlat et al. |
| 2017/0359136 | A1 | 12/2017 | Dufrene et al. |

FOREIGN PATENT DOCUMENTS

| | | |
|---|---|---|
| EP | 3043482 A1 | 7/2016 |
| JP | H0936764 A | 1/1997 |
| JP | 2006129419 A | 5/2006 |
| JP | 2010041291 A | 2/2010 |
| JP | 2012517757 A | 8/2012 |
| KR | 20070104951 A | 10/2007 |
| WO | 0227950 A2 | 4/2002 |
| WO | 2010092115 A1 | 8/2010 |
| WO | 2011148341 A1 | 12/2011 |

OTHER PUBLICATIONS

Supplementary European Search Report—EP18879183—Search Authority—Munich—Jul. 8, 2021.

* cited by examiner

SYSTEMS AND METHODS FOR ENHANCED-ISOLATION COEXISTING TIME-DIVISION DUPLEXED TRANSCEIVERS

CROSS-REFERENCE TO RELATED APPLICATIONS

This application is a continuation of U.S. application Ser. No. 17/153,010, filed 20 Jan. 2021, which is a continuation of U.S. application Ser. No. 16/653,057, filed 15 Oct. 2019, which is a continuation of U.S. application Ser. No. 16/197,200, filed 20 Nov. 2018, which claims the benefit of U.S. Provisional Application Ser. No. 62/588,864, filed on 20 Nov. 2017, and of U.S. Provisional Application Ser. No. 62/714,378, filed on 3 Aug. 2018, all of which are incorporated in their entireties by this reference.

TECHNICAL FIELD

This invention relates generally to the wireless communications field, and more specifically to new and useful systems and methods for enhanced-isolation coexisting time-division duplexed transceivers.

BACKGROUND

Traditional wireless communication systems are half-duplex; that is, they are not capable of transmitting and receiving signals simultaneously on a single wireless communications channel. One way that this issue is addressed is through the use of time division duplexing (TDD), in which transmission and reception occur on the same frequency channel, but at different times. In many modern communication devices, two or more unsynchronized TDD operating in the same frequency band (but on different channels) exist near each other. While all radios are transmitting or all radios are receiving, such devices work well, but when some radios are transmitting and some are receiving, the performance of such devices is limited. Thus, there is a need in the wireless communications field to create new and useful systems and methods for enhanced-isolation coexisting time-division duplexed transceivers. This invention provides such new and useful systems and methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. Coexisting Time-Division-Duplexed (TDD) Transceivers

As referenced in the background section, many modern communications devices feature coexisting (i.e., having antennas in close physical proximity to each other and configured to communicate on the same frequency band or on frequency bands close in frequency) TDD transceivers. For example, many wireless access points feature dual 5 GHz WiFi transceivers, and most laptop computers have both a 2.4 GHz WiFi transceiver and a Bluetooth transceiver (which also operates at 2.4 GHz). Still other configurations include coexisting 5 GHz WiFi, LTE, and/or MulteFire transceivers.

Figure 1:
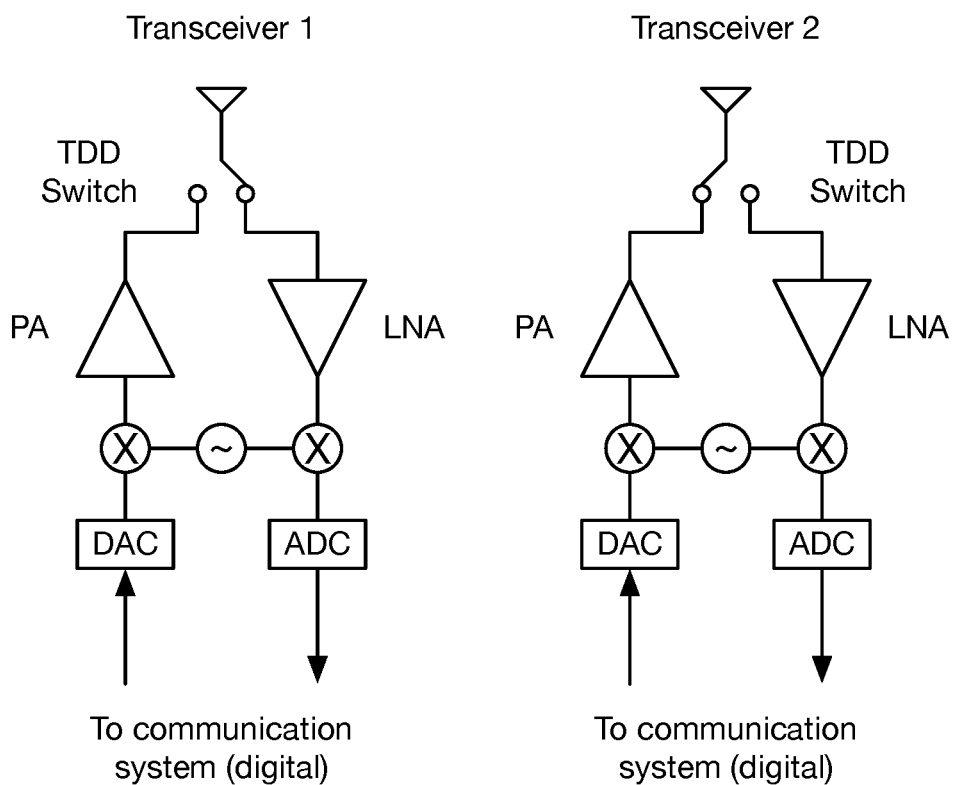
FIG. 1 is prior art representation of coexisting TDD transceivers.

An example of such a communications system is as shown in FIG. 1. Note that the transmit/receive chains of each transceiver are independent of each other. Further, note that when a transceiver is in receive mode, the transmit path of that receiver is not in use; when a transceiver is in transmit mode, likewise, the receive path of that receiver is not in use.

When a transceiver is active in receive mode while another coexisting transceiver is active in transmit mode, the receiving transceiver's performance is degraded. Two effects contribute to this degradation. The first arises from the fact that the transmit signal of the transmitting transceiver is much more powerful than the signal the receiving transceiver is trying to receive. Even though the signals are of different frequencies, the signals are close enough in frequency (e.g., in different channels of the same frequency band) that the transmit signal can saturate the receiving transceiver (in this context, the transmit signal is called a "blocker"). The second is because the transmit signal is not perfectly contained within its channel, and some noise may leak into the receive channel.

1. System for Enhanced-Isolation Coexisting TDD Transceivers

A system 100 for enhanced-isolation coexisting TDD transceivers includes at least one of the following: a tunable analog filter 110, a tunable digital filter 111, an analog blocker canceller 120, a digital blocker canceller 121, an analog transmit-noise canceller 130, a digital transmit-noise canceller 131, a local oscillator (LO) exchanger 140, an antenna thru-matcher 150, and an auxiliary canceller 170. The system 100 may also include any number of additional elements to enable interference cancellation and/or filtering, including signal couplers 160, amplifiers 161, frequency upconverters 162, frequency downconverters 163, analog-to-digital converters (ADC) 164, digital-to-analog converters (DAC) 165, time delays 166, filters 167, switches 168, and any other circuit components (e.g., phase shifters, attenuators, transformers, etc.).

The system 100 functions to reduce signal degradation in coexisting TDD transceivers by reducing interference in a receiving transceiver while simultaneously operating a coexisting transmitting transceiver. The system 100 preferably reduces interference both by partially or fully mitigating effects of the transmit signal as a blocker signal (in the transmit channel or otherwise) and by removing noise generated in the receive channel by the transmit signal.

The system 100 is preferably implemented using digital and/or analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 100 preferably includes memory to store configuration data, but may additionally or alternatively be configured using externally stored configuration data or in any suitable manner.

The system 100 may additionally or alternatively may be implemented in any manner using any optical, photonic, phonon-photonic, micro-electrical-mechanical systems (MEMS), nano-electrical-mechanical systems (NEMS), light, acoustic, opto-acoustic, mechanical, opto-mechanical, electrical, opto-electrical or otherwise-optically-or-acoustically-related techniques.

The system 100 may be arranged in various architectures, enabling flexibility for a number of applications. In some embodiments, the system 100 may be attached or coupled to existing transceivers; additionally or alternatively, the system 100 may be integrated into transceivers. Examples of architectures of the system 100 are as shown in FIGS. 2-4B. It is understood that the system 100 may use combinations of aspects of these architectures in various manners.

Figure 2A:
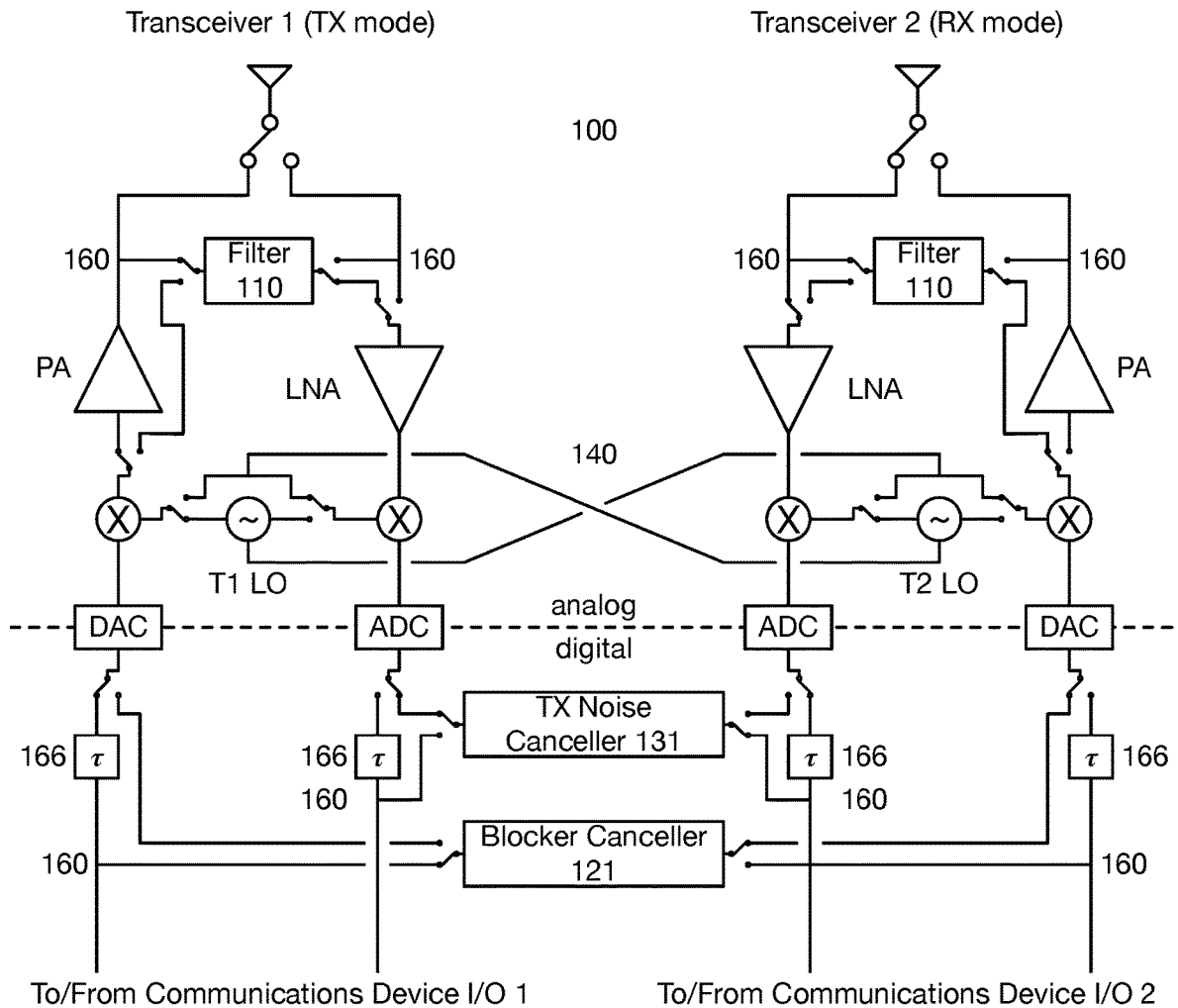
FIG. 2A is a diagram representation of a system of an invention embodiment.

As shown in FIG. 2A, in a first implementation of an invention embodiment, the system 100 includes two tunable analog filters 110, a digital blocker canceler 121, a digital TX noise canceller 131, an LO exchanger 140, and a plurality of couplers 160, delays 166, and switches 168 (note that due to space constraints, the switches 168 are not explicitly labeled "168"). Further note that while distinct signal paths and switches are shown in the digital domain, this is intended to clearly show how the system 100 may route signals in multiple operating modes (e.g., Transceiver 1 transmitting, Transceiver 2 receiving is a first mode; Transceiver 2 transmitting, Transceiver 1 receiving is a second mode) rather than imply a particular digital implementation (the switches in the digital domain may be accomplished in many ways rather than requiring a particular implementation).

Note that the implementation of FIG. 2A makes substantive use of previously existing pathways of the coexisting transceivers; e.g., the native local oscillators are re-used as well as parts of the un-used receive and transmit paths (this is clearly visible when comparing FIGS. 1 and 2A). Also note that by flipping every switch of FIG. 2A, the implementation may provide interference reduction when transceiver 1 in RX mode and transceiver 2 is in TX mode.

Figure 2B:
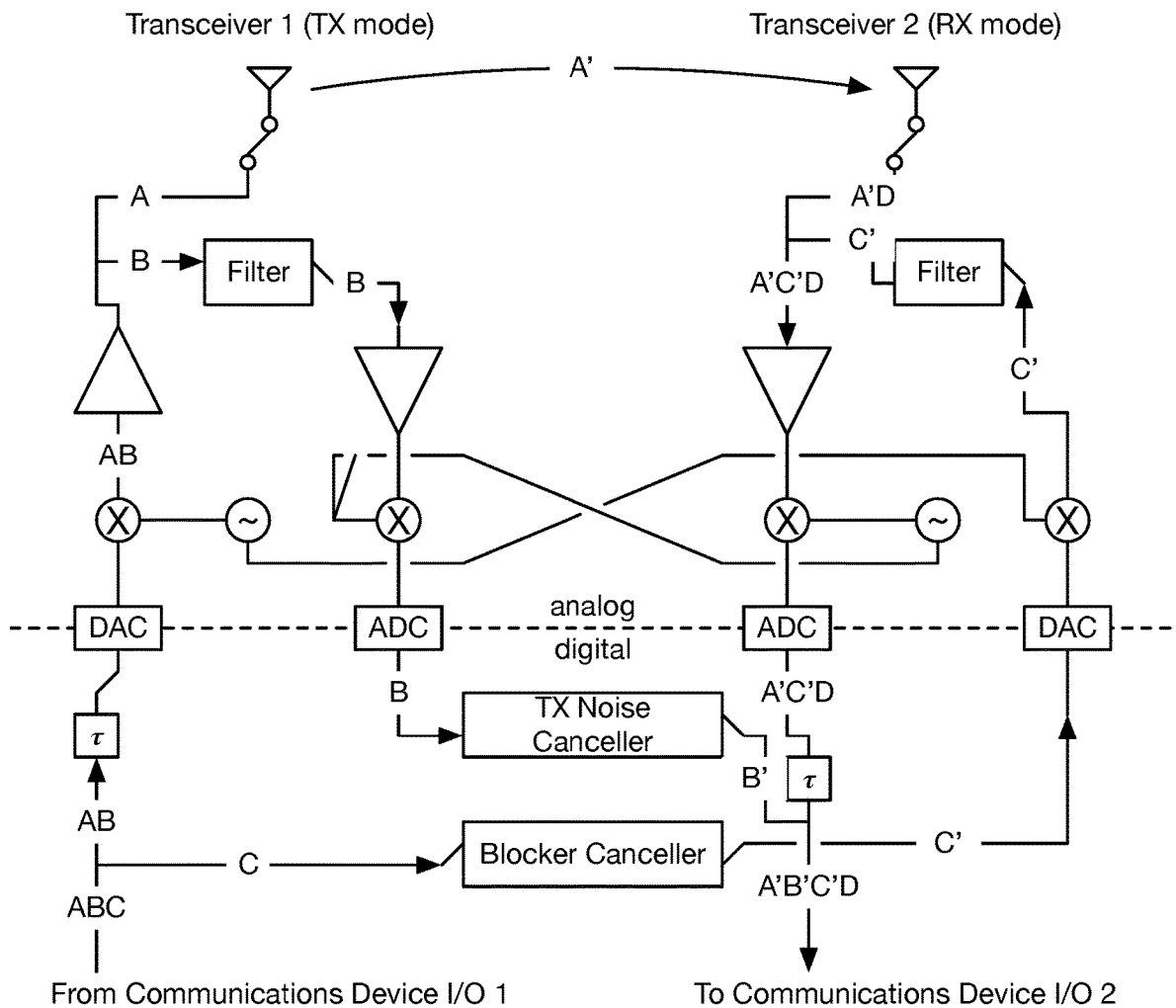
FIG. 2B is a signal path representation of a system of an invention embodiment.

A signal path diagram of the implementation of FIG. 2A is as shown in FIG. 2B; this diagram can be used to explain operation of this implementation. The diagram begins with the transmit signal (written as "ABC"). At the output of communications device I/O 1, the label "ABC" represents three signal components of the transmit signal (A, B, and C)— while the transmit signal need not actually have three separate components, this label enables one to track how various parts of the signal are split, transformed, and recombined as they move through the system 100. Next, the transmit signal is split (into "AB" and "C"). C passes to a blocker canceller that transforms C from a transmit signal component to a blocker cancellation signal C' (i.e., a signal that can be combined with a received signal to remove undesirable signal outside of the receive channel). Then, C' is filtered (to remove noise added by generation of the blocker cancellation signal). Meanwhile, AB passes through a time delay (which compensates for delay imposed by the blocker canceller) and is converted to a radio-frequency (RF) signal. AB is then split into A and B—A is transmitted by the transmit antenna while B is filtered (to remove signal in the transmit band—the blocker) and then transformed by the TX noise canceller to a TX noise cancellation signal B' (i.e., a signal that can be combined with a receive signal to remove undesirable signal within the receive channel). A is received at the receiver as A' (a transformation occurs due to the wireless transmission between transceiver 1 and 2) along with D (an intended receive signal). C' is then combined with A'D to remove blocker signal. A'C'D is converted back to digital and then combined with B' to remove transmit noise, resulting in the final signal A'B'C'D.

Figure 2C:
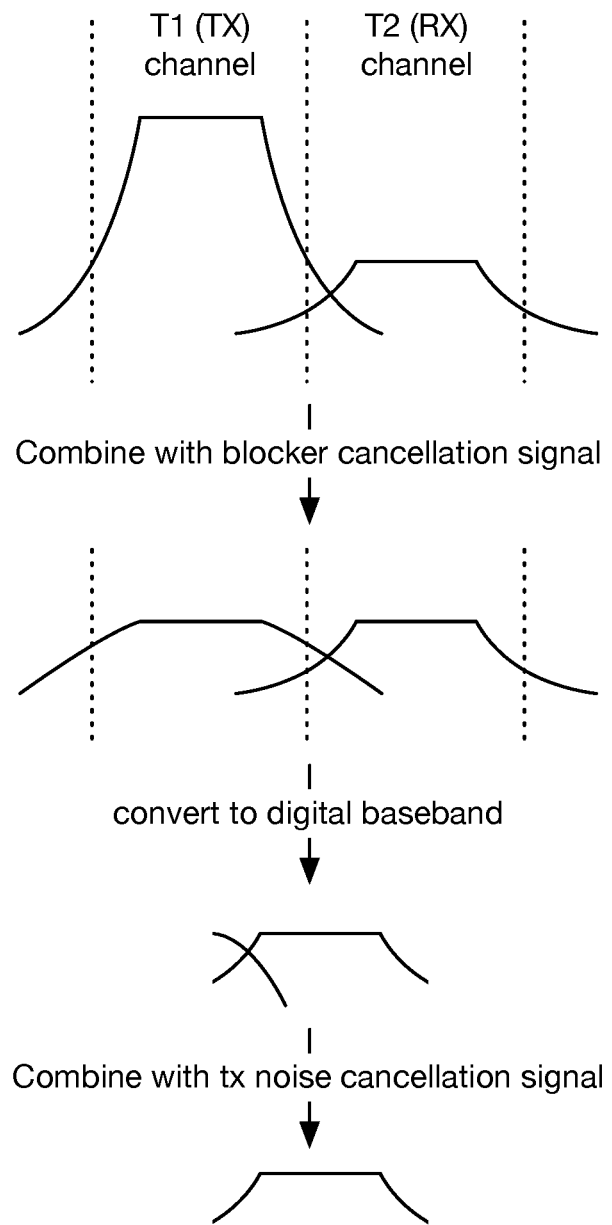
FIG. 2C is a channel power representation of signal transformation of a system of an invention embodiment.

A signal power diagram of this process is as shown in FIG. 2C. As shown in FIG. 2C, the signal as received at the receiver (A'D) includes undesirable signal in both the transmit band and the receive band. When A'D is combined with blocker cancellation signal C', the power of undesirable signal in the transmit band is reduced. Then, the signal A'C'D can be converted from RF to a digital baseband signal (the process of which can further remove undesirable signal in the transmit band). Next, the signal A'C'D can be combined with the transmit noise cancellation signal B', which reduces undesirable signal remaining in the signal (this undesirable signal was, prior to downconversion, in the receive band), resulting in a signal with reduced interference (A'B'C'D).

Note that while in this implementation the leftside filter 110 functions to remove signal in the transmit band (on B) and the rightside filter 110 functions to remove noise added by generation of the blocker cancellation signal (on C'), these functions would be inverted if the system 100 were switched (e.g., to transceiver 1 in RX mode and transceiver 2 in TX mode). This is achieved by the leftside filter no tuned to reject T2 LO frequency, and the rightside filter no tuned to reject T1 LO frequency.

Figure 3A:
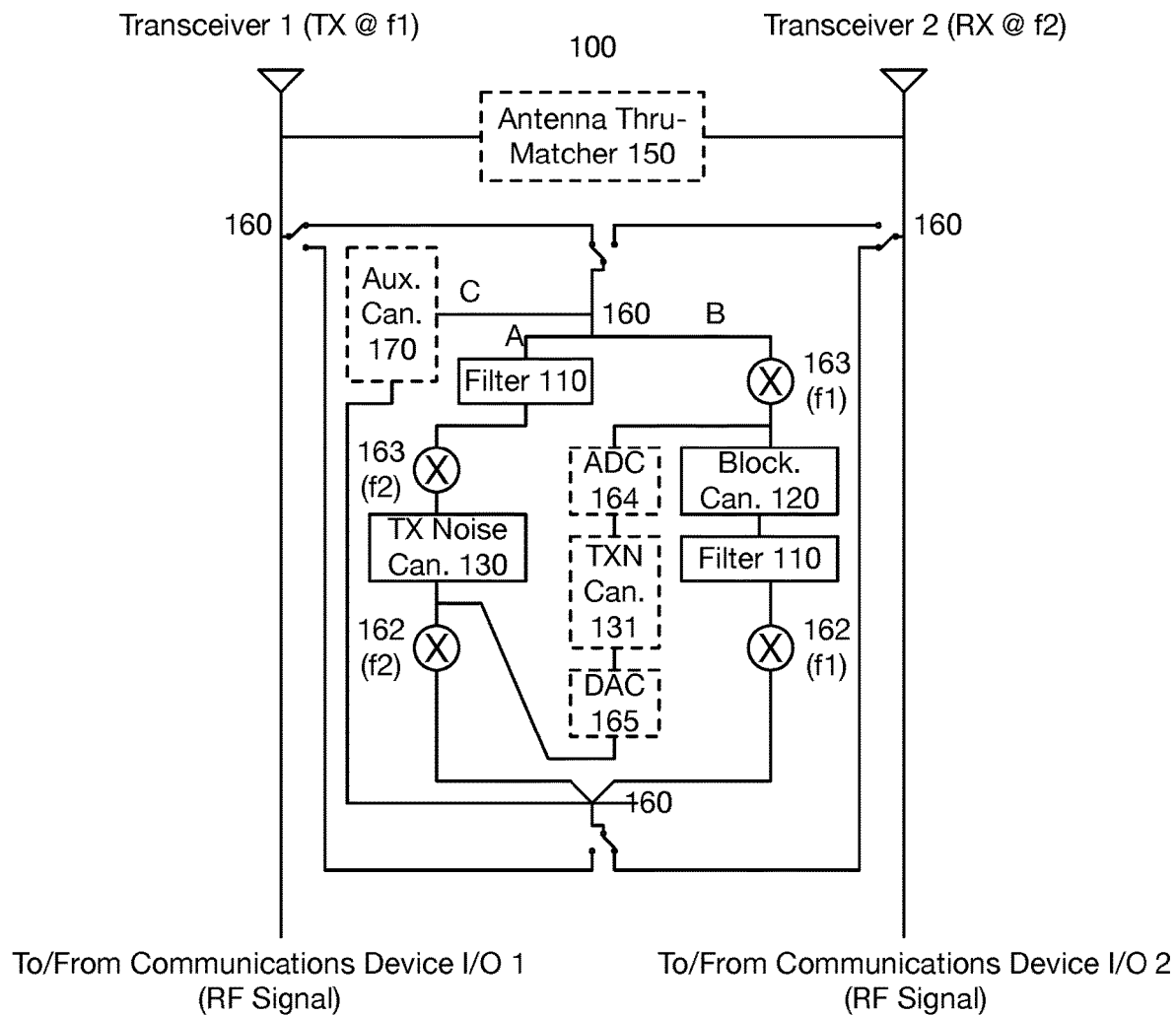
FIG. 3A is a diagram representation of a system of an invention embodiment.

As shown in FIG. 3A, in a second implementation of an invention embodiment, the system 100 includes two tunable analog filters no, an analog blocker canceler 120, an analog TX noise canceller 130, a plurality of couplers 160, and switches 168 (note that due to space constraints, the switches 168 are not explicitly labeled "168"). As shown, this implementation may optionally include a digital TX noise canceller 131, an antenna thru-matcher 150, and/or an auxiliary canceller 170.

This implementation may be useful for scenarios in which access to transceiver stages is limited (e.g., for a system 100 designed to be implemented in the front end of a communications system/for a system 100 that has limited access to analog baseband and/or digital signals); note that in this implementation, the system 100 is coupled only to RF input/outputs of the communication device.

In this implementation, the transmit side is sampled at RF and split into several signal components. The first of these (labeled A) is filtered by a filter 110 (preferably to remove signal in the transmit band; e.g., a blocker, relaxing dynamic range requirements of the canceller 130); next the component is downconverted to baseband using a frequency downconverter 163 operating at f2 (the current receive frequency) and then transformed, using the TX Noise Canceller 130, into a transmit noise cancellation signal. Optionally, a second TX noise canceller 130/131 that samples the transmit band of the transmit signal may be used (e.g., to remove intermodulation products present in the primary transmit noise cancellation signal resulting from downconversion or cancellation signal generation)—note that this canceller (like all other cancellers in system 100 implementations) may be implemented either in digital or in analog. If a canceller is implemented in the digital domain but using analog signals, ADCs 164 and DACs 165 may be used as shown in FIG. 3A. The transmit noise cancellation signal is then upconverted back to f2 (the current receive frequency).

The second component (labeled B) is downconverted to baseband using a frequency downconverter 163 operating at f1 (current transmit frequency). The second component is then transformed into a blocker cancellation signal by the analog blocker canceller 120, and then filtered by a filter 110 (to remove unwanted frequency components in the receive band generated by blocker cancellation signal generation). (If the second TX noise canceller 130/131 is present, the second component may also be sampled to aid in signal cancellation in the RX band as described in the preceding section). Finally, the blocker cancellation signal is converted back to RF at f1 (the current transmit frequency).

In some variations of the second implementation, the system 100 may additionally include an auxiliary canceller 170 operating at RF (f1 in this case), which may be used to aid in blocker cancellation, transmit noise cancellation, and/or any other signal cancellation desired. For example, a simple (i.e., having less complexity than the cancellers 120/121 and/or 130/131) auxiliary canceller 170 operating at RF may be helpful in cancelling interference with short delay times between transmission and reception (due to a lower delay imposed by the auxiliary canceller 170).

In some variations of the second implementation, the system 100 may additionally include an antenna thru-matcher 150, which functions to reduce interference present at a receiver antenna by modifying coupling between antennas (described in more detail in later sections).

Figure 3B:
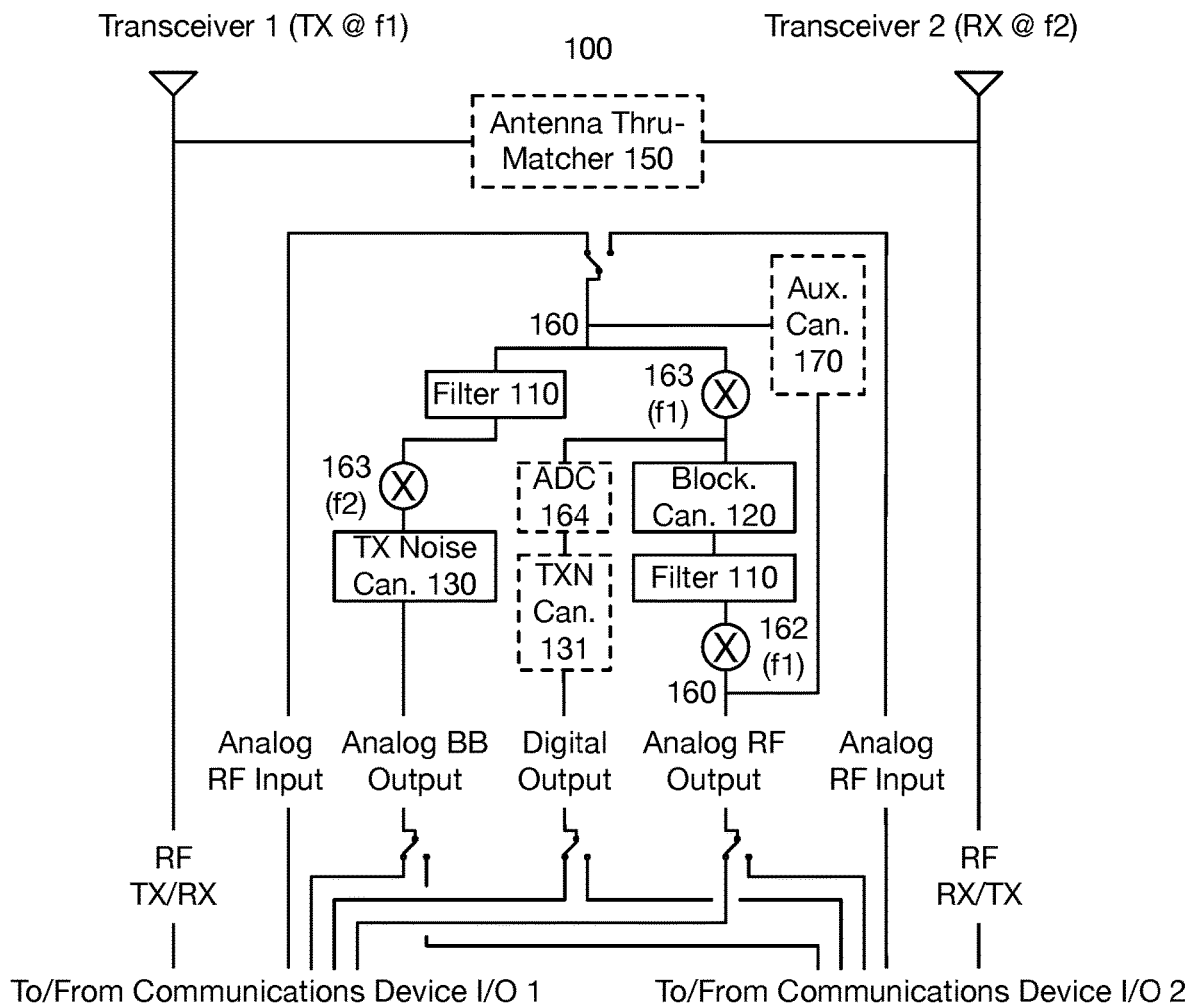
FIG. 3B is a diagram representation of a system of an invention embodiment.

A third implementation of an invention embodiment is as shown in FIG. 3B. This implementation is similar to that of FIG. 3A, except that the system 100 features multiple inputs and outputs, suitable for a communication device with access to analog baseband and/or digital pathways. In this implementation, for example, the power amplifier of a transmitter may be used to actively divide signal between a transmit antenna output and the system 100. Further, some signals (e.g., the TX noise cancellation signal) may be combined at baseband, likewise, other signals (e.g., output of the second TX Noise canceller 131) may be combined in the digital domain with receive signals to accomplish cancellation.

Note that the system 100 may take the form of any combination of these two implementations depending on what inputs and outputs are available for use in a given communications system.

Figure 4A:
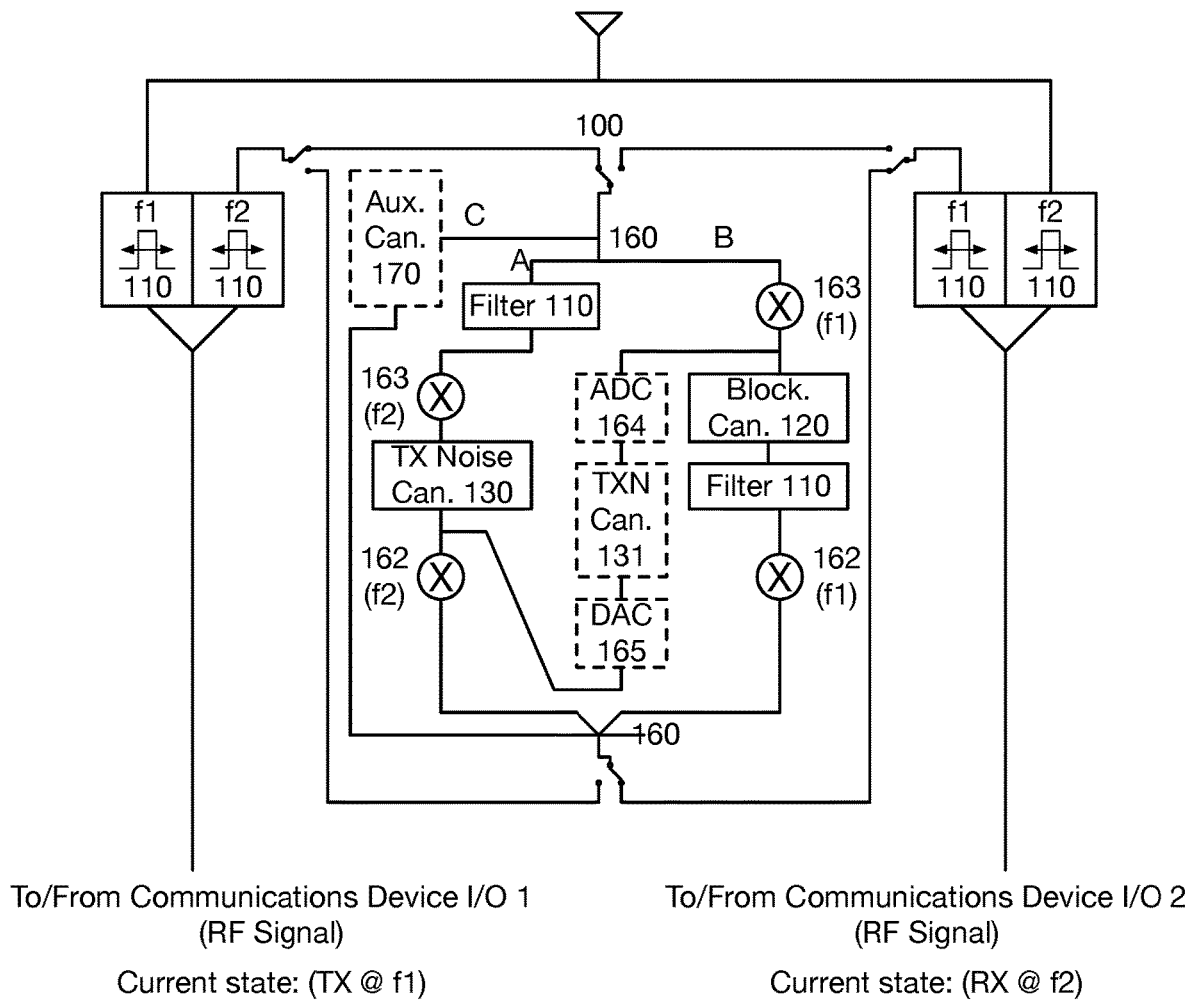
FIG. 4A is a diagram representation of a system of an invention embodiment.
Figure 4B:
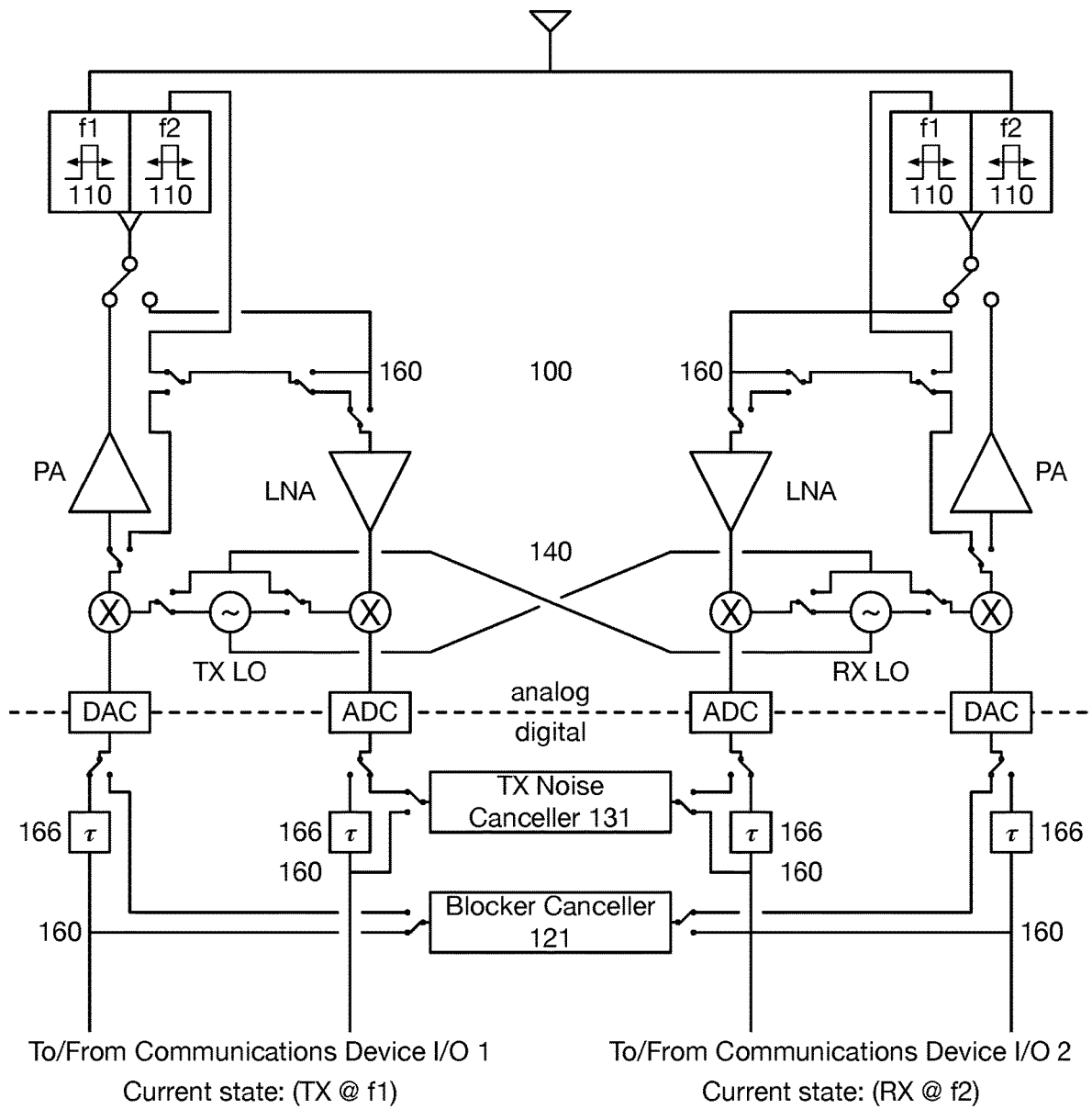
FIG. 4B is a diagram representation of a system of an invention embodiment.

While the preceding examples show multi-antenna architectures, it is understood that the system 100 may also be implemented using duplexers and/or other circuits enabling the use of antennas by multiple transceivers. For example, an implementation of the system 10o similar to that of FIG. 3A may be implemented using a five-port duplexer (implemented with four bandpass filters no), as shown in FIG. 4A. Likewise, an implementation of the system 100 similar to that of FIG. 2A may also be implemented using a five-port duplexer (implemented with four bandpass filters no), as shown in FIG. 4B.

The filters 110 and 111 function to remove or reduce the presence of undesired frequency components within a signal. The analog filter no is implemented in the analog domain, while the digital filter 111 is implemented in the digital domain. Each filter 110/111 functions to transform signal components according to the response of the filter, which may introduce a change in signal magnitude, signal phase, and/or signal delay.

Filters 110/111 are preferably bandpass filters, but may be any type of filter (e.g., notch filter, bandstop filter, low-pass filter, high-pass filter). Filters 110/111 are preferably analog resonant element filters, but may additionally or alternatively be any type of filter (including digital filters). Resonant elements of the filters 110/111 are preferably formed by lumped elements, but may additionally or alternatively be distributed element resonators, ceramic resonators, SAW resonators, crystal resonators, cavity resonators, or any suitable resonators.

The filters 110/111 are preferably tunable such that one or more peaks of the filter 110/111 may be shifted. In one implementation of a preferred embodiment, one or more resonant elements of the filter 110/111 may include a variable shunt capacitance (e.g., a varactor or a digitally tunable capacitor) that enables filter peaks to be shifted. Additionally or alternatively, filters 110/111 may be tunable by quality factor (i.e., Q may be modified by altering circuit control values), or filters 110/111 may be not tunable.

Filters 110/111 may include, in addition to resonant elements, delayers, phase shifters, and/or scaling elements.

The filters 110/111 are preferably passive filters, but may additionally or alternatively be active filters. The filters 110/111 are preferably implemented with analog circuit components (no), but may additionally or alternatively be digitally implemented (111). The center frequency of any tunable peak of a filter 110/111 is preferably controlled by a tuning circuit, but may additionally or alternatively be controlled by any suitable system (including manually controlled, e.g. as in a mechanically tuned capacitor).

In particular, filters 110/111 may be useful to reduce insertion loss within a frequency range of interest. Filters 110/111 may also be useful to reduce the power seen by noise and/or interference cancellation systems. Note that used to enhance interference and/or noise cancellation, as opposed to independently suppressing noise (as a filter may be used for in a system without interference and/or noise cancellation), a less-expensive, smaller, lower-quality factor (Q), and/or lower-rejection-capability filter may be used.

Filters 110/111 may additionally or alternatively be used to add time delays to a signal (because the filters themselves may impose a time delay upon a signal).

The blocker cancellers 120 and 121 function to remove self-interference present in a receive signal (in a receive channel) due to the presence of the transmit signal in a transmit channel (close to but typically not identical to the receive channel). Such interference is particularly an issue where RF signals are converted to digital as part of reception (because the transmit signal, despite being in a different band, can overwhelm the receive signal if filtering rejection is not high enough or the receiver does not have a large enough dynamic range). The blocker cancellers 120/121 function to mitigate interference present in the transmit band of a signal using self-interference cancellation techniques; that is, generating a self-interference cancellation signal by transforming signal samples of a first signal (typically a transmit signal) into a representation of self-interference present in another signal (e.g., a receive signal, a transmit signal after amplification, etc.), due to transmission of the first signal and then subtracting that interference cancellation signal from the other signal.

The blocker cancellers 120/121 are preferably used to cancel interference present in the transmit band of a receive signal; i.e., the blocker cancellers 120/121 generate an interference cancellation signal from samples of a transmit signal using a circuit that models the representation of the transmit signal, in the transmit band, as received by a receiver, and subtracts that cancellation signal from the receive signal.

The blocker cancellers 120/121 may additionally be used to cancel interference present in the transmit band (TxB) of a transmit signal sample; i.e., the blocker cancellers 120/121 generate an interference cancellation signal from samples of a transmit signal using a circuit that models the representation of the transmit signal, in the transmit band, as generated by a transmitter (generally, but not necessarily, before transmission at an antenna), and subtracts that cancellation signal from the transmit signal sample. This type of interference cancellation is generally used to 'clean' a transmit signal sample; that is, to remove transmit band signal of a transmit sample, so that the sample contains primarily information in the receive band (allowing the sample to be used to perform receive-band interference cancellation).

Blocker cancellers may be implemented in analog (120), digital (121), or a combination of the two. The analog blocker canceller 120 functions to produce an analog interference cancellation signal from an analog input signal. The analog blocker canceller 120 may be used to cancel interference in any signal, using any input, but the analog blocker canceller 120 is preferably used to cancel transmit band interference in an analog receive signal. The analog blocker canceller 120 may also be used to cancel transmit band signal components in a transmit signal sample (to perform transmit signal cleaning as previously described).

Using upconverters, downconverters, ADCs, and DACs, the analog blocker canceller 120 may convert digital signals to analog input signals, and may additionally convert interference cancellation signals from analog to digital (or to another analog signal of different frequency).

The analog blocker canceller 120 is preferably designed to operate at a single frequency band (e.g., baseband), but may additionally or alternatively be designed to operate at multiple frequency bands. The analog blocker canceller 120 is preferably substantially similar to the circuits related to analog self-interference cancellation of U.S. patent application Ser. No. 14/569,354 (the entirety of which is incorporated by this reference); e.g., the RF self-interference canceller, the IF self-interference canceller, associated up/downconverters, and/or tuning circuits, except that the analog blocker canceller 120 is not necessarily applied solely to cancellation of interference in a receive signal resulting from transmission of another signal (as previously described).

The analog blocker canceller 120 is preferably implemented as an analog circuit that transforms an analog input signal into an analog interference cancellation signal by combining a set of filtered, scaled, and/or delayed versions of the analog input signal, but may additionally or alternatively be implemented as any suitable circuit. For instance, the analog blocker canceller 120 may perform a transformation involving only a single version, copy, or sampled form of the analog input signal. The transformed signal (the analog interference cancellation signal) preferably represents at least a part of an interference component in another signal.

The analog blocker canceller 120 is preferably adaptable to changing self-interference parameters in addition to changes in the input signal; for example, transceiver temperature, ambient temperature, antenna configuration, humidity, and transmitter power. Adaptation of the analog blocker canceller 120 is preferably performed by a tuning circuit, but may additionally or alternatively be performed by a control circuit or other control mechanism included in the canceller or any other suitable controller (e.g., by the transform adaptor of the digital blocker canceller 121).

Figure 5:
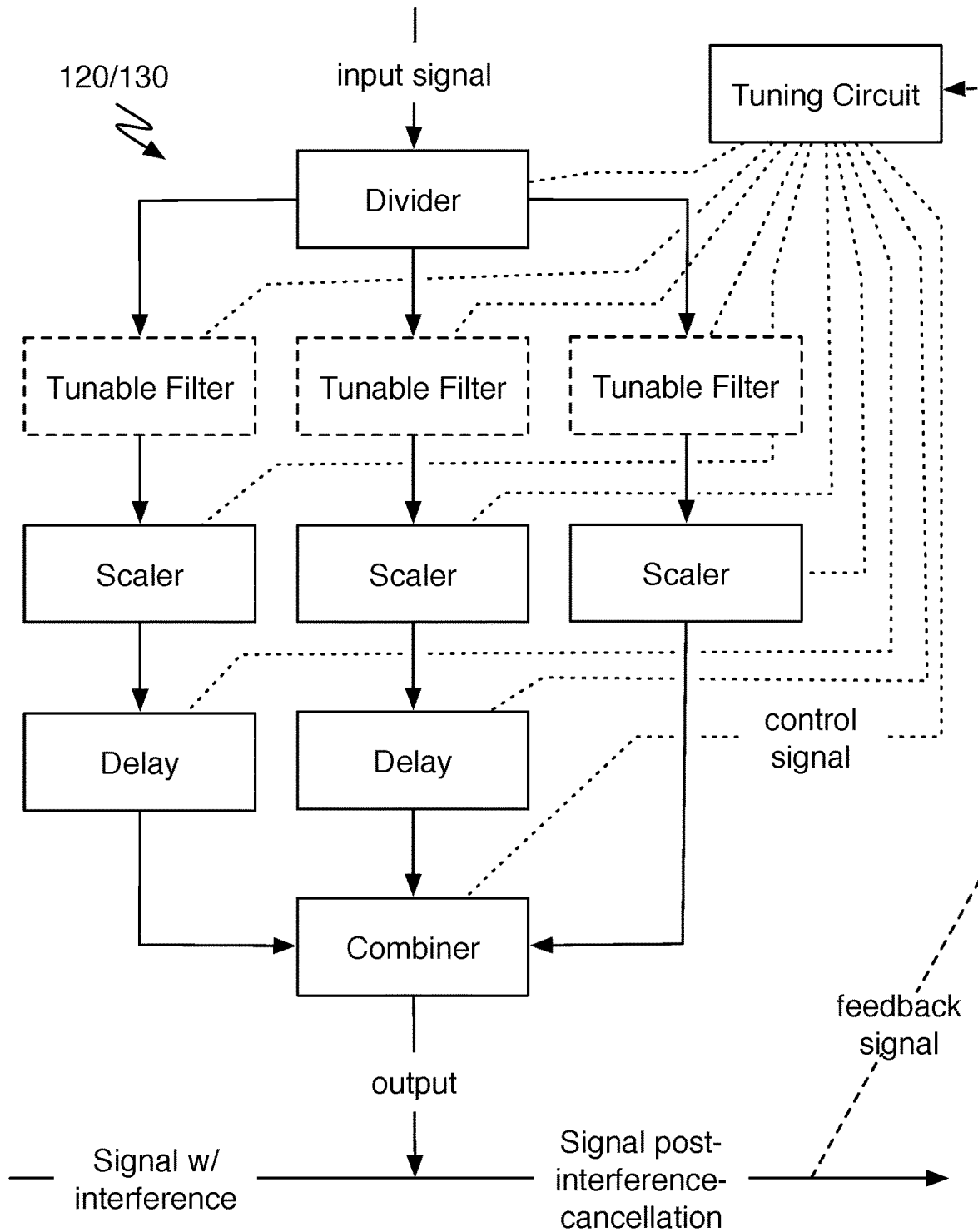
FIG. 5 is a diagram representation of an analog interference canceller of a system of an invention embodiment.

In one implementation of a preferred embodiment, the analog blocker canceller 120 includes a set of scalers (which may perform gain, attenuation, or phase adjustment), a set of delays, a signal combiner, a signal divider, and a tuning circuit, as shown in FIG. 5. In this implementation the analog blocker canceller 120 may optionally include tunable filters (e.g., bandpass filters including an adjustable center frequency, lowpass filters including an adjustable cutoff frequency, etc.).

The tuning circuit preferably adapts the analog blocker canceller 120 configuration (e.g., parameters of the filters, scalers, delayers, signal divider, and/or signal combiner, etc.) based on a feedback signal sampled from a signal after interference cancellation is performed (i.e., a residue signal). For example, the tuning circuit may set the analog blocker canceller 120 configuration iteratively to reduce interference present in a residue signal. The tuning circuit preferably adapts configuration parameters using online gradient-descent methods (e.g., LMS, RLMS), but configuration parameters may additionally or alternatively be adapted using any suitable algorithm. Adapting configuration parameters may additionally or alternatively include alternating between a set of configurations. Note that analog blocker cancellers 120 may share tuning circuits and/or other components (although each analog blocker canceller 120 is preferably associated with a unique configuration or architecture). The tuning circuit may be implemented digitally and/or as an analog circuit.

The digital blocker canceller 111 functions to produce a digital interference cancellation signal from a digital input signal according to a digital transform configuration. The digital blocker canceller 111 may be used to cancel interference in any signal, using any input, but the digital blocker canceller 111 is preferably used to cancel transmit band interference in an analog receive signal (by converting a digital interference cancellation signal to analog using a DAC and combining it with the analog receive signal). The digital blocker canceller 111 may also be used to cancel transmit band signal components in a transmit signal (to perform transmit signal cleaning as previously described).

Using upconverters, downconverters, ADCs, and DACs, the digital blocker canceller 111 may convert analog signals of any frequency to digital input signals, and may additionally convert interference cancellation signals from digital to analog signals of any frequency.

The digital transform configuration of the digital blocker canceller 111 includes settings that dictate how the digital blocker canceller 111 transforms a digital transmit signal to a digital interference signal (e.g. coefficients of a generalized memory polynomial used to transform a transmit signal to an interference cancellation signal). The transform configuration for a digital blocker canceller 111 is preferably set adaptively by a transform adaptor, but may additionally or alternatively be set by any component of the system 100 (e.g., a tuning circuit) or fixed in a set transform configuration.

The digital blocker canceller 111 is preferably substantially similar to the digital self-interference canceller of U.S. Provisional Application No. 62/268,388, the entirety of which is incorporated by this reference, except in that the digital blocker canceller 111 is not necessarily applied solely to cancellation of interference in a receive signal resulting from transmission of another signal (as previously described).

Figure 6:
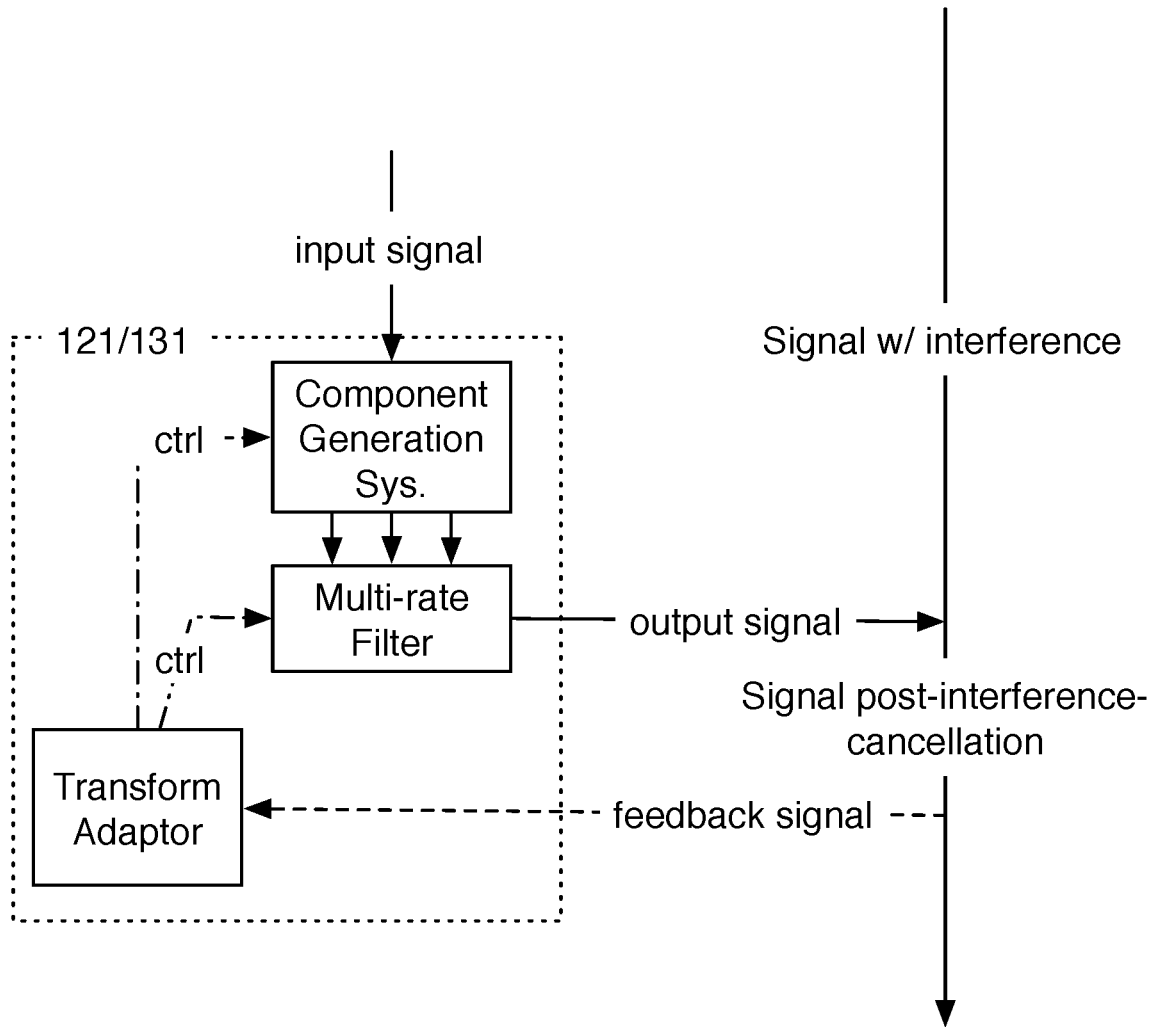
FIG. 6 is a diagram representation of a digital interference canceller of a system of an invention embodiment.

In one implementation of a preferred embodiment, the digital blocker canceller 111 includes a component generation system, a multi-rate filter, and a transform adaptor, as shown in FIG. 6.

The component generation system functions to generate a set of signal components from the sampled input signal (or signals) that may be used by the multi-rate filter to generate an interference cancellation signal. The component generation system preferably generates a set of signal components intended to be used with a specific mathematical model (e.g., generalized memory polynomial (GMP) models, Volterra models, and Wiener-Hammerstein models); additionally or alternatively, the component generation system may generate a set of signal components usable with multiple mathematical models.

In some cases, the component generator may simply pass a copy of a sampled transmit signal unmodified; this may be considered functionally equivalent to a component generator not being explicitly included for that particular path.

The multi-rate adaptive filter functions to generate an interference cancellation signal from the signal components produced by the component generation system. In some implementations, the multi-rate adaptive filter may additionally function to perform sampling rate conversions (similarly to an upconverter 1030 or downconverter 1040, but applied to digital signals). The multi-rate adaptive filter preferably generates an interference cancellation signal by combining a weighted sum of signal components according to mathematical models adapted to model interference contributions of the transmitter, receiver, channel and/or other sources. Examples of mathematical models that may be used by the multi-rate adaptive filter include generalized memory polynomial (GMP) models, Volterra models, and Wiener-Hammerstein models; the multi-rate adaptive filter may additionally or alternatively use any combination or set of models.

The transform adaptor functions to set the transform configuration of the multi-rate adaptive filter and/or the component generation system. The transform configuration preferably includes the type of model or models used by the multi-rate adaptive filter as well as configuration details pertaining to the models (each individual model is a model type paired with a particular set of configuration details). For example, one transform configuration might set the multi-rate adaptive filter to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the signal component generation system and/or the multi-rate adaptive filter. For example, if the signal component generation system includes multiple transform paths, the transform adaptor may set the number of these transform paths, which model order their respective component generators correspond to, the type of filtering used, and/or any other suitable details. In general, the transform configuration may include any details relating to the computation or structure of the signal component generation system and/or the multi-rate adaptive filter.

The transform adaptor preferably sets the transform configuration based on a feedback signal sampled from a signal post-interference-cancellation (i.e., a residue signal). For example, the transform adaptor may set the transform configuration iteratively to reduce interference present in a residue signal. The transform adaptor may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

Note that digital blocker cancellers 111 may share transform adaptors and/or other components (although each digital blocker canceller 111 is preferably associated with its own transform configuration).

The transmit-noise cancellers 130 and 131 function to remove self-interference present in a receive signal (in a receive channel) due to the presence of the transmit signal in the receive channel (e.g., due to noise generated in the receive channel by power amplification of the transmit signal). The transmit-noise cancellers 130/131 function to mitigate interference present in the receive band of a signal using self-interference cancellation techniques; that is, generating a self-interference cancellation signal by transforming signal samples of a first signal (typically a transmit signal) into a representation of self-interference present in another signal (e.g., a receive signal, a transmit signal after amplification, etc.), due to transmission of the first signal and then subtracting that interference cancellation signal from the other signal.

The transmit-noise cancellers 130/131 are preferably used to cancel interference present in the receive band of a receive signal; i.e., the transmit-noise cancellers 130/131 generate an interference cancellation signal from samples of receive band components of a transmit signal using a circuit that models the representation of the transmit signal, in the receive band, as received by a receiver, and subtracts that cancellation signal from the receive signal.

The analog transmit-noise canceller 130 is preferably substantially similar in structure to the analog blocker canceller 120, but may additionally or alternatively be any suitable analog interference canceller.

The digital transmit-noise canceller 131 is preferably substantially similar in structure to the digital blocker canceller 121, but may additionally or alternatively be any suitable digital interference canceller.

The local oscillator exchanger 140 functions to allow the reuse of local oscillators to perform signal downconversion/upconversion tasks (this reuse not only reduces signal complexity, but also decreases phase noise in transmitted/received signals). The local oscillator exchanger 140 preferably includes switches and signal paths that allow the local oscillator from one transceiver to be coupled to the signal paths of another (e.g., as shown in FIG. 2A). As shown in FIG. 2A, the transceiver 1 (T1) LO is used both to upconvert the transmitted signal to RF (@f1) and to upconvert the blocker cancellation signal (@f1 using the transmit chain of transceiver 2 (T2)), and the T2 LO is used both to downconvert the received signal to baseband (@f2) and to downconvert the transmit signal samples used to generate the TX noise cancellation signal to baseband (@f2).

The local oscillator exchanger 140 may accomplish the reuse or other sharing of local oscillators in any manner.

Figure 7:
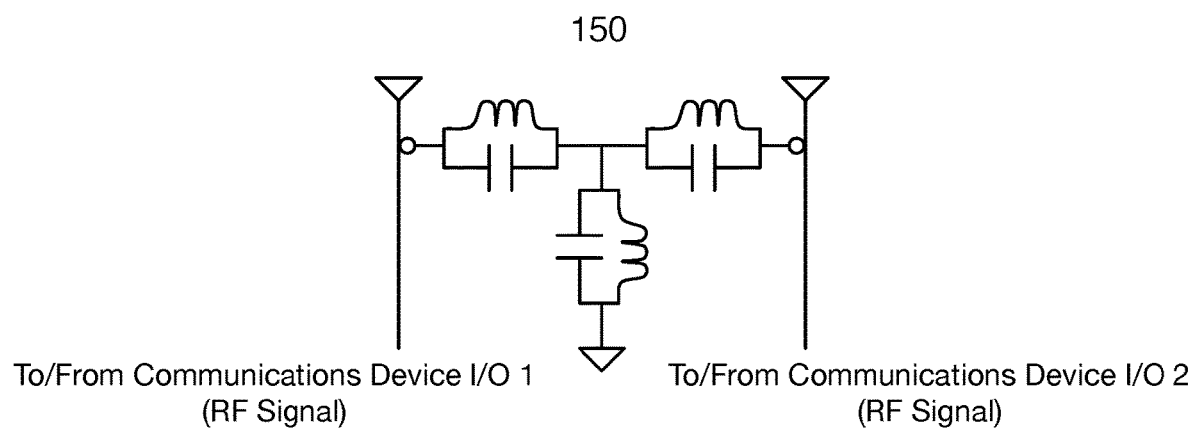
FIG. 7 is a diagram representation of an antenna thru-matcher of a system of an invention embodiment.

The antenna thru-matcher 150, as shown in FIG. 7, functions to modify coupling between antennas to reduce the amount of interference present at the receive antenna due to the transmit signal. The antenna thru-matcher 150 preferably includes tunable analog circuit components (e.g., tunable inductors/capacitors/resistors) but may additionally or alternatively include any analog and/or digital circuit components.

Note specifically that the antenna thru-matcher 150 may be tuned not to maximize transmission power/avoid reflection at the transmit antenna (as is typical for antenna matching networks) but may instead be tuned to reduce coupling of signal transmitted by the transmit antenna into the receive antenna.

The antenna thru-matcher 150 is preferably tuned based on a communication environment (e.g., specific antennas in specific locations with specific reflection sources and signal paths) but may additionally or alternatively not be tuned during setup/operation of the system 100 or may be tuned in any manner.

Signal couplers 160 function to allow analog signals to be split and/or combined. While not necessarily shown in the figures, signal couplers are preferably used at each junction (e.g., splitting, combining) of two or more analog signals; alternatively, analog signals may be coupled, joined, or split in any manner. In particular, signal couplers 160 may be used to provide samples of transmit signals, as well as to combine interference cancellation signals with other signals (e.g., transmit or receive signals). Alternatively, signal couplers 160 may be used for any purpose. Signal couplers 160 may couple and/or split signals using varying amounts of power; for example, a signal coupler 160 intended to sample a signal may have an input port, an output port, and a sample port, and the coupler 160 may route the majority of power from the input port to the output port with a small amount going to the sample port (e.g., a 99.9%/0.1% power split between the output and sample port, or any other suitable split).

The signal coupler 160 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 160 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 160 are preferably phase-shifted by ninety degrees, but may additionally or alternatively be in phase or phase shifted by a different amount.

Amplifiers 161 function to amplify signals of the system 100. Amplifiers may include any analog or digital amplifiers. Some examples of amplifiers 161 include low-noise amplifiers (LNA) typically used to amplify receive signals and power amplifiers (PA) typically used to amplify transmit signals prior to transmission.

Frequency upconverters 162 function to upconvert a carrier frequency of an analog signal (typically from baseband to RF, but alternatively from any frequency to any other higher frequency). Upconverters 162 preferably accomplish signal upconversion using heterodyning methods, but may additionally or alternatively use any suitable upconversion methods.

The upconverter 162 preferably includes a local oscillator (LO), a mixer, and a bandpass filter. The local oscillator functions to provide a frequency shift signal to the mixer; the mixer combines the frequency shift signal and the input signal to create (usually two, but alternatively any number) frequency shifted signals, one of which is the desired output signal, and the bandpass filter rejects signals other than the desired output signal. Alternatively, the upconverter 162 may not include a filter (e.g., if filtering is provided elsewhere or is not necessary).

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog integrated circuits (ICs), digital ICs, and/or any other suitable components. The mixer preferably functions to combine two or more electrical input signals into one or more composite outputs, where each output includes some characteristics of at least two input signals.

The bandpass filter (of the upconverter) is preferably a tunable bandpass filter centered around an adjustable radio frequency. Additionally, or alternatively, the bandpass filter may be a bandpass filter centered around a set radio frequency, or any other suitable type of filter. The bandpass filter is preferably a passive filter, but may additionally or alternatively be an active filter. The bandpass filter is preferably implemented with analog circuit components, but may additionally or alternatively be digitally implemented.

In variations in which the bandpass filter is tunable, the center frequency of each tunable filter is preferably controlled by a control circuit or tuning circuit, but may additionally or alternatively be controlled by any suitable system (including manually controlled, e.g. as in a mechanically tuned capacitor). Each tunable bandpass filter preferably has a set quality (Q) factor, but may additionally or alternatively have a variable Q factor. The tunable bandpass filters may have different Q factors; for example, some of the tunable filters may be high-Q, some may be low-Q, and some may be no-Q (flat response).

Frequency downconverters 163 function to downconvert the carrier frequency of an analog signal (typically to baseband, but alternatively to any frequency lower than the carrier frequency). The downconverter 163 preferably accomplishes signal downconversion using heterodyning methods, but may additionally or alternatively use any suitable downconversion methods.

The downconverter 163 preferably includes a local oscillator (LO), a mixer, and a baseband filter. Alternatively, the downconverter 163 may not include a filter (e.g., if filtering is provided elsewhere or is not necessary). The local oscillator functions to provide a frequency shift signal to the mixer; the mixer combines the frequency shift signal and the input signal to create (usually two) frequency shifted signals, one of which is the desired signal, and the baseband filter rejects signals other than the desired signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, a bandpass filter, or any other suitable type of filter. The baseband filter is preferably a passive filter, but may additionally or alternatively be an active filter. The baseband filter is preferably implemented with analog circuit components, but may additionally or alternatively be digitally implemented.

Note that the bandpass filter of the frequency upconverter 162 and the baseband filter of the frequency downconverter 163 are specific examples of a filter 110 (or 111).

Analog-to-digital converters (ADCs) 164 function to convert analog signals (typically at baseband, but additionally or alternatively at any frequency) to digital signals. ADCs 164 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

Digital-to-analog converters (DACs) 165 function to convert digital signals to analog signals (typically at baseband, but additionally or alternatively at any frequency). The DAC 165 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

Time delays 166 function to delay signal components. Delays 166 may be implemented in analog (e.g., as a time delay circuit) or in digital (e.g., as a time delay function). Delays 166 may be fixed, but may additionally or alternatively introduce variable delays. The delay 166 is preferably implemented as an analog delay circuit (e.g., a bucket-brigade device, a long transmission line, a series of RC networks) but may additionally or alternatively be implemented in any other suitable manner. If the delay 166 is a variable delay, the delay introduced may be set by a tuning circuit or other controller of the system 100. Although not necessarily explicitly shown in figures, delays 166 may be coupled to the system 100 in a variety of ways to delay one signal relative to another. For example, delays 166 may be used to delay a receive or transmit signal to account for time taken to generate an interference cancellation signal (so that the two signals may be combined with the same relative timing). Delays 166 may potentially be implemented as part of or between any two components of the system 100.

The auxiliary canceller 170 functions to aid in cancellation removal in addition to the blocker cancellers 120/121 and transmit noise cancellers 130/131. For example, a simple (e.g., single tap) auxiliary canceller 170 at RF may supplement baseband cancellers 130/120 (as shown in FIG. 3A). The auxiliary canceller 170 may be either analog (in which case it is preferably similar in structure to the analog blocker canceller 120) or digital (in which case it is preferably similar in structure to the digital blocker canceller 121). The auxiliary canceller may additionally or alternatively be any suitable interference or noise canceller.

As a person skilled in the art will recognize from the previous detailed description and from the figures and claims, modifications and changes can be made to the preferred embodiments of the invention without departing from the scope of this invention defined in the following claims.

We claim:

1. A system for enhancing isolation in coexisting first and second time-division duplexed (TDD) transceivers, comprising a blocker canceller that, in a first operating mode, samples a transmit signal of the first TDD transceiver and transforms the sampled transmit signal into a blocker cancellation signal configured to remove transmit-band interference in a receive signal of the second TDD transceiver; wherein, in the first operating mode:
   the transmit signal is transmitted in a first frequency band;
   the transmit-band interference is received in the first frequency band; and
   the receive signal is received in a second frequency band non-identical to the first frequency band.

2. The system of claim 1, wherein the system is operable to switch between the first operating mode and a second operating mode, wherein, in the second operating mode:
   the blocker canceller samples a second transmit signal of the second TDD transceiver and transforms the sampled second transmit signal into a second blocker cancellation signal configured to remove second transmit-band interference in a second receive signal of the first TDD transceiver;
   the second transmit signal is transmitted in the second frequency band;
   the second transmit-band interference is received in the second frequency band; and
   the receive signal is received in the first frequency band.

3. The system of claim 2, further comprising a first TDD transceiver local oscillator (T1 LO), a second TDD transceiver local oscillator (T2 LO), and a local oscillator exchanger; wherein:
   in the first operating mode:
      a first transmit chain of the first TDD transceiver, in cooperation with the T1 LO, upconverts the transmit signal to the first frequency band;
      a second transmit chain of the second TDD transceiver, in cooperation with the T1 LO and the local oscillator exchanger, upconverts the blocker cancellation signal to an RF blocker cancellation signal in the first frequency band; and
      a second receive chain of the second TDD transceiver, in cooperation with the T2 LO, downconverts the receive signal; and
   in the second operating mode:
      the second transmit chain, in cooperation with the T2 LO, upconverts the second transmit signal to the second frequency band, wherein the second transmit signal is sampled by the blocker canceller before upconversion by the second TDD transceiver;
      the first transmit chain, in cooperation with the T2 LO and the local oscillator exchanger, upconverts the second blocker cancellation signal to a second RF blocker cancellation signal in the second frequency band; and
      a first receive chain of the first TDD transceiver, in cooperation with the T1 LO, downconverts the receive signal.

4. The system of claim 3, wherein:
in the first operating mode, the transmit signal is sampled by the blocker canceller before upconversion by the first TDD transceiver; and
in the second operating mode, the second transmit signal is sampled by the blocker canceller before upconversion by the second TDD transceiver.

5. The system of claim 4, wherein:
in the first operating mode, the RF blocker cancellation signal is combined with the receive signal before frequency downconversion to reduce blocker interference in the receive signal; and
in the second operating mode, the second RF blocker cancellation signal is combined with the second receive signal before frequency downconversion to reduce blocker interference in the second receive signal.

6. The system of claim 3, wherein:
in the first operating mode, the RF blocker cancellation signal is combined with the receive signal before frequency downconversion to reduce blocker interference in the receive signal; and
in the second operating mode, the second RF blocker cancellation signal is combined with the second receive signal before frequency downconversion to reduce blocker interference in the second receive signal.

7. The system of claim 3, further comprising a first delay and a second delay, wherein:
in the first operating mode:
the first delay imposes a first time delay on the transmit signal after the blocker canceller samples the transmit signal; and
the system is configured to bypass the second delay; and
in the second operating mode:
the second delay imposes a second time delay on the second transmit signal after the blocker canceller samples the second transmit signal; and
the system is configured to bypass the first delay.

8. The system of claim 2, wherein:
in the first operating mode, the system combines a first set of cancellation signals, comprising the blocker cancellation signal, with the receive signal of the second TDD transceiver, resulting in generation of a reduced-interference receive signal; and
in the second operating mode, the system combines a second set of cancellation signals, comprising the second blocker cancellation signal, with the second receive signal of the first TDD transceiver, resulting in generation of a second reduced-interference receive signal.

9. The system of claim 2, further comprising a five-port duplexer that electrically couples the first and second TDD transceivers to an antenna, the five-port duplexer comprising:
a first bandpass filter electrically coupled to the first TDD transceiver, wherein, in the first operating mode, the first bandpass filter is configured to pass signals of the first frequency band;
a second bandpass filter electrically coupled to the first TDD transceiver, wherein, in the first operating mode, the second bandpass filter is configured to pass signals of the second frequency band;
a third bandpass filter electrically coupled to the second TDD transceiver, wherein, in the first operating mode, the third bandpass filter is configured to pass signals of the first frequency band; and
a fourth bandpass filter electrically coupled to the second TDD transceiver, wherein, in the first operating mode, the fourth bandpass filter is configured to pass signals of the second frequency band.

10. The system of claim 9, wherein, in the second operating mode:
the first and third bandpass filters are configured to pass signals of the first frequency band; and
the second a fourth bandpass filters are configured to pass signals of the second frequency band.

11. A system for enhancing isolation in coexisting first and second time-division duplexed (TDD) transceivers, comprising a transmit-noise canceller that, in a first operating mode, samples a first transmit signal of the first TDD transceiver and transforms the sampled first transmit signal into a first transmit-noise cancellation signal configured to remove first receive-band interference in a first receive signal of the second TDD transceiver; wherein:
in the first operating mode:
the first transmit signal is transmitted in a first frequency band;
the first receive-band interference is in a second frequency band non-identical to the first frequency band; and
the first receive signal is received in the second frequency band;
the system, in the first operating mode, combines a first set of cancellation signals, comprising the first transmit-noise cancellation signal, with the first receive signal of the second TDD transceiver, resulting in generation of a first reduced-interference receive signal;
the system is operable to switch between the first operating mode and a second operating mode;
in the second operating mode, the transmit-noise canceller samples a second transmit signal of the second TDD transceiver and transforms the sampled second transmit signal into a second transmit-noise cancellation signal configured to remove second receive-band interference in a second receive signal of the first TDD transceiver; wherein, in the second operating mode:
the second transmit signal is transmitted in the second frequency band;
the second receive-band interference is in the first frequency band; and
the second receive signal is received in the first frequency band; and
the system, in the second operating mode, combines a second set of cancellation signals, comprising the second transmit-noise cancellation signal, with the second receive signal of the first TDD transceiver, resulting in generation of a second reduced-interference receive signal.

12. The system of claim 11, further comprising a first delay and a second delay, wherein:
in the first operating mode:
the first delay imposes a first time delay on the first receive signal; and
the system is configured to bypass the second delay; and
in the second operating mode:
the second delay imposes a second time delay on the second receive signal; and
the system is configured to bypass the first delay.

13. The system of claim 11, further comprising a first TDD transceiver local oscillator (T1 LO), a second TDD transceiver local oscillator (T2 LO), and a local oscillator exchanger; wherein:

in the first operating mode:
  a first transmit chain of the first TDD transceiver, in cooperation with the T1 LO, upconverts the first transmit signal to the first frequency band;
  a first receive chain of the first TDD transceiver, in cooperation with the T2 LO and the local oscillator exchanger, downconverts the sampled first transmit signal;
  the transmit-noise canceller receives the downconverted sampled first transmit signal; and
  a second receive chain of the second TDD transceiver, in cooperation with the T2 LO, downconverts the first receive signal; and
in the second operating mode:
  a second transmit chain of the second TDD transceiver, in cooperation with the T2 LO, upconverts the second transmit signal to the second frequency band;
  the second receive chain, in cooperation with the T1 LO and the local oscillator exchanger, downconverts the sampled second transmit signal;
  the transmit-noise canceller receives the downconverted sampled second transmit signal; and
  the first receive chain, in cooperation with the T1 LO, downconverts the second receive signal.

14. The system of claim 13, further comprising a five-port duplexer that electrically couples the first and second TDD transceivers to an antenna, the five-port duplexer comprising:
  a first bandpass filter electrically coupled to the first TDD transceiver, wherein, in the first operating mode, the first bandpass filter is configured to pass signals of the first frequency band;
  a second bandpass filter electrically coupled to the first TDD transceiver, wherein, in the first operating mode, the second bandpass filter is configured to pass signals of the second frequency band;
  a third bandpass filter electrically coupled to the second TDD transceiver, wherein, in the first operating mode, the third bandpass filter is configured to pass signals of the first frequency band; and
  a fourth bandpass filter electrically coupled to the second TDD transceiver, wherein, in the first operating mode, the fourth bandpass filter is configured to pass signals of the second frequency band.

15. The system of claim 14, wherein, in the second operating mode:
  the first and third bandpass filters are configured to pass signals of the first frequency band; and
  the second a fourth bandpass filters are configured to pass signals of the second frequency band.

16. The system of claim 13, further comprising a blocker canceller, wherein:
  in the first operating mode, the blocker canceller samples the first transmit signal and transforms the sampled first transmit signal into a first blocker cancellation signal configured to remove transmit-band interference in the first receive signal; and
  in the second operating mode, the blocker canceller samples the second transmit signal and transforms the sampled second transmit signal into a second blocker cancellation signal configured to remove transmit-band interference in the second receive signal.

17. The system of claim 16, wherein:
  in the first operating mode, the second transmit chain, in cooperation with the T1 LO and the local oscillator exchanger, upconverts the first blocker cancellation signal to an RF blocker cancellation signal in the first frequency band; and
  in the second operating mode, the first transmit chain, in cooperation with the T2 LO and the local oscillator exchanger, upconverts the second blocker cancellation signal to a second RF blocker cancellation signal in the second frequency band.

18. The system of claim 11, further comprising a five-port duplexer that electrically couples the first and second TDD transceivers to an antenna, the five-port duplexer comprising:
  a first bandpass filter electrically coupled to the first TDD transceiver, wherein, in the first operating mode, the first bandpass filter is configured to pass signals of the first frequency band;
  a second bandpass filter electrically coupled to the first TDD transceiver, wherein, in the first operating mode, the second bandpass filter is configured to pass signals of the second frequency band;
  a third bandpass filter electrically coupled to the second TDD transceiver, wherein, in the first operating mode, the third bandpass filter is configured to pass signals of the first frequency band; and
  a fourth bandpass filter electrically coupled to the second TDD transceiver, wherein, in the first operating mode, the fourth bandpass filter is configured to pass signals of the second frequency band.

19. The system of claim 18, wherein, in the second operating mode:
  the first and third bandpass filters are configured to pass signals of the first frequency band; and
  the second a fourth bandpass filters are configured to pass signals of the second frequency band.

20. The system of claim 18, further comprising a blocker canceller, wherein:
  in the first operating mode, the blocker canceller samples the first transmit signal and transforms the sampled first transmit signal into a first blocker cancellation signal configured to remove transmit-band interference in the first receive signal; and
  in the second operating mode, the blocker canceller samples the second transmit signal and transforms the sampled second transmit signal into a second blocker cancellation signal configured to remove transmit-band interference in the second receive signal.

* * * * *